US008539029B2

(12) United States Patent
Manning et al.

(10) Patent No.: US 8,539,029 B2
(45) Date of Patent: Sep. 17, 2013

(54) PRE-SEND EVALUATION OF E-MAIL COMMUNICATIONS

(75) Inventors: Sara L. Manning, Bellevue, WA (US); Jesse M. Dougherty, Seattle, WA (US); Shawn M. Thomas, Seattle, WA (US); Nathan F. Waddoups, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 911 days.

(21) Appl. No.: 11/927,592

(22) Filed: Oct. 29, 2007

(65) Prior Publication Data

US 2009/0113001 A1   Apr. 30, 2009

(51) Int. Cl.
*G06F 3/048* (2013.01)

(52) U.S. Cl.
USPC ........... 709/206; 709/245; 715/824; 715/821; 715/810; 715/764

(58) Field of Classification Search
USPC ................. 709/206, 245; 715/824, 821, 810, 715/764
See application file for complete search history.

(56) References Cited

U.S. PATENT DOCUMENTS

| | | | |
|---|---|---|---|
| 6,430,604 B1 | 8/2002 | Ogle | |
| 6,434,601 B1 | 8/2002 | Rollins | |
| 6,671,718 B1 * | 12/2003 | Meister et al. | 709/206 |
| 6,684,238 B1 | 1/2004 | Dutta | |
| 6,839,737 B1 | 1/2005 | Friskel | |
| 6,895,426 B1 * | 5/2005 | Cortright et al. | 709/206 |
| 6,993,563 B2 | 1/2006 | Lytle | |
| 7,444,381 B2 | 10/2008 | Malik | |
| 8,171,416 B2 * | 5/2012 | Urquhart et al. | 715/758 |
| 2002/0032602 A1 | 3/2002 | Lanzillo, Jr. et al. | |
| 2002/0188690 A1 | 12/2002 | Lee | |
| 2003/0120733 A1 * | 6/2003 | Forman | 709/206 |
| 2003/0200265 A1 * | 10/2003 | Henry | 709/206 |

(Continued)

FOREIGN PATENT DOCUMENTS

| | | |
|---|---|---|
| CN | 1893439 A | 1/2007 |
| JP | 05-241993 | 9/1993 |

(Continued)

OTHER PUBLICATIONS

DJ Adams, A More Sensitive Mail Notifier, O'Reilly's *Programming Jabber* book, Apr. 13, 2001, 9 pages.

(Continued)

*Primary Examiner* — Kenneth R Coulter
(74) *Attorney, Agent, or Firm* — Merchant & Gould

(57) ABSTRACT

A system for identifying attributes associated with content of an e-mail message and alerting a user includes a client device programmed to allow a user to create an e-mail message including at least one recipient and a message content, a server programmed to check an attribute of the e-mail message, and to send the e-mail message, and one or more information stores in communication with the server, the information stores including information about the e-mail message. The server is programmed to query the information stores to obtain information about the e-mail message as the message is being composed by the user, and the server sends a mail tip to the client regarding the e-mail message. The client is programmed to provide the mail tip to the user, the mail tip being formatted and positioned by the client so that it is integrated within a header section of the e-mail message.

14 Claims, 9 Drawing Sheets

(56) References Cited

U.S. PATENT DOCUMENTS

| | | | |
|---|---|---|---|
| 2004/0103162 A1* | 5/2004 | Meister et al. ............... | 709/206 |
| 2005/0010644 A1 | 1/2005 | Brown et al. | |
| 2005/0278430 A1 | 12/2005 | Cato | |
| 2006/0036712 A1 | 2/2006 | Morris | |
| 2006/0059544 A1 | 3/2006 | Guthrie et al. | |
| 2006/0064739 A1* | 3/2006 | Guthrie et al. ............... | 726/3 |
| 2006/0168062 A1* | 7/2006 | Hebert et al. ............... | 709/206 |
| 2006/0224968 A1* | 10/2006 | Urquhart et al. ............ | 715/741 |
| 2006/0294188 A1 | 12/2006 | Daniels | |
| 2007/0005708 A1 | 1/2007 | Juliano | |
| 2007/0043866 A1 | 2/2007 | Garbow | |
| 2007/0055735 A1 | 3/2007 | Raghunandan | |
| 2007/0088788 A1 | 4/2007 | Goldberg | |
| 2007/0130323 A1 | 6/2007 | Landsman et al. | |
| 2007/0192418 A1* | 8/2007 | Adams et al. ............... | 709/206 |
| 2007/0294428 A1* | 12/2007 | Guy et al. ............... | 709/245 |
| 2008/0104175 A1* | 5/2008 | Keohane et al. ............ | 709/206 |
| 2008/0104177 A1* | 5/2008 | Keohane et al. ............ | 709/206 |
| 2008/0147818 A1* | 6/2008 | Sabo ............... | 709/206 |
| 2008/0208988 A1 | 8/2008 | Khouri | |
| 2009/0007143 A1 | 1/2009 | Chang | |
| 2009/0113001 A1 | 4/2009 | Manning | |
| 2009/0259723 A1 | 10/2009 | Roic | |

FOREIGN PATENT DOCUMENTS

| | | |
|---|---|---|
| JP | 5241993 A | 9/1993 |
| JP | 09-200256 | 7/1997 |
| JP | 9200256 A | 7/1997 |
| JP | 2007-188240 A | 7/2007 |
| JP | 2007-193717 | 8/2007 |
| JP | 2007193717 | 8/2007 |
| KR | 10-2006-0088280 A | 8/2006 |
| KR | 10-2007-0012149 A | 1/2007 |
| WO | WO2007064418 A1 | 6/2007 |

OTHER PUBLICATIONS

Chinese First Office Action cited in Application No. 200880114595.6 mailed Aug. 25, 2011 (with English Translation).
Chinese Second Office Action cited in Application No. 200880114595.6 mailed Jul. 3, 2012 (with English Translation).
Japanese Notice of Rejection cited in Application No. 2010-531232 mailed Jun. 8, 2012 (with English Translation).
Atomic Mail Verifier 5.05; Aug. 13, 2007, 4 pages.
International Search Report in PCT/US2009/036518, dated Oct. 22, 2009, 11 pages.
Verify addresses; Copyright 1995-2007, 3 pages.
Verma, Vikas; HOWTO: EWS : Get SMTP address from X500 address; Resolve Names; Sep. 5, 2007; 4 pages.
Jan. 25, 2010 Non-Final Office Action for U.S. Appl. No. 12/101,130.
Extended European Search Report dated Dec. 4, 2012 in Application No. 08845424.4, 6 pages.
Japanese Notice of Rejection mailed Jun. 8, 2012 in Application No. 2010-531232, 6 pages.
Fourth Chinese Office Action mailed May 31, 2013 in Application No. 200880114595.6, 17 pages.

* cited by examiner

PRE-SEND EVALUATION OF E-MAIL COMMUNICATIONS

BACKGROUND

Due to the asynchronous nature of e-mail systems, it is possible for an e-mail message to not be successfully delivered to the intended recipient. The unsuccessful delivery of an e-mail message can occur for many reasons. For example, the e-mail message may be too large for the recipient's mailbox, or the recipient's mailbox may be full. In addition, embarrassing and costly mistakes can be made when composing e-mail messages. For example, a private e-mail may be inadvertently sent to a large audience, or confidential material may be inadvertently sent to external recipients.

These problems occur because information about the e-mail system and about the recipients of an e-mail message are not available to the sender while the message is being composed. It is only after sending the message that the problem is discovered.

SUMMARY

The present disclosure relates to a systems and methods for validating the content of an e-mail message during the composition of the message and alerting a user of attributes associated with the message before the e-mail message is sent.

In example embodiments, during the composition of the e-mail message, the server receives notification when certain compose events occur. This notification is presented to the user. The notification can take the form of a mail tip which alerts to user to attributes associated with the message.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

The accompanying drawings incorporated in and forming a part of the specification illustrate several aspects of the present disclosure, and together with the description serve to explain the principles of the disclosure. In the drawings.

DETAILED DESCRIPTION

The present application is directed to systems and methods for validating the content of an e-mail message during the composition of the message, before the message is sent to its intended recipients.

Figure 1:
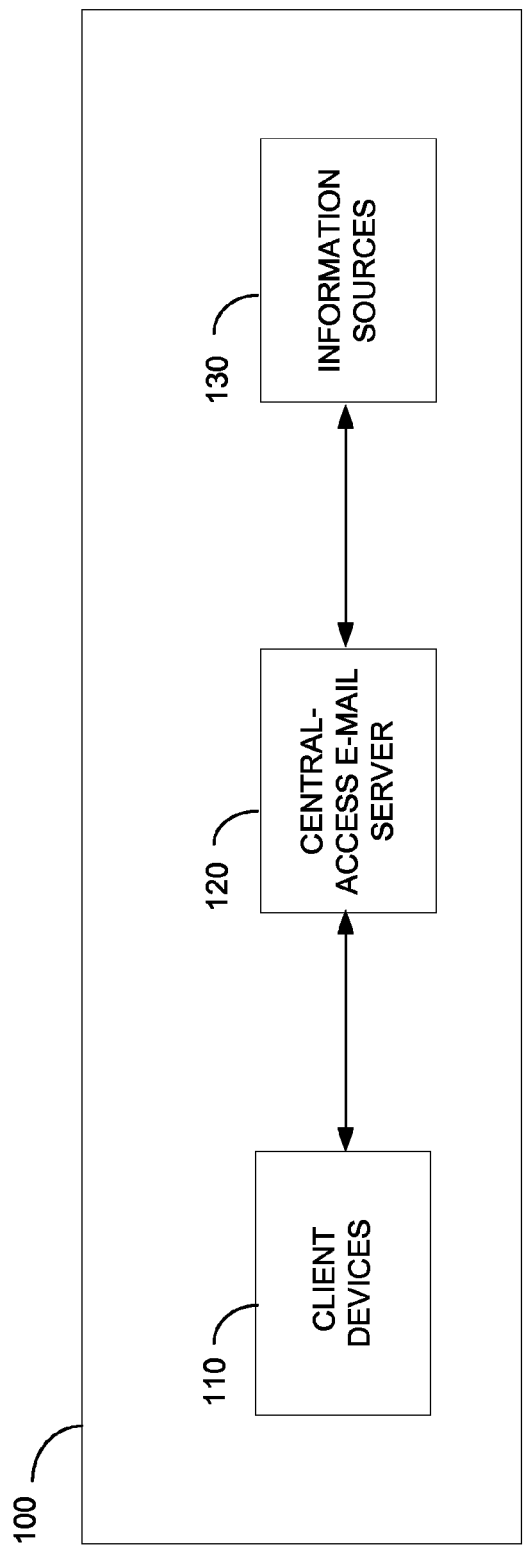
FIG. 1 is an illustration of an example e-mail communication system.

FIG. 1 shows an example system 100 for validating the content of an e-mail message. The system includes one or more client devices 110, a central-access e-mail server 120, and information sources 130.

A client device 110 may be a desktop device such as a personal computer or a mobile device such as a personal digital assistant. In example embodiments, the client device 110 is a computer system, such as a desktop computer, laptop computer, personal data assistant, or cellular device. The client 110 can include input/output devices, a central processing unit ("CPU"), a data storage device, and a network device. Typical input/output devices include keyboards, mice, displays, microphones, speakers, disk drives, CD-ROM drives, and flash drives. Computer readable media, such as the data storage device, provide for data retention. By way of example, computer readable media can include computer storage media and communication media. Computer storage media includes volatile and nonvolatile, removable and non-removable media implemented in any method or technology for storage of information such as computer readable instructions, data structures, program modules or other data. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Among the plurality of information stored on the data storage device is a client operating system ("OS") and client applications. The client OS is a program that manages the hardware and software resources of the client system. The client applications utilize the resources of the client 110 to directly perform tasks specified by the user. The network device enables the client 110 to send and receive data to/from the server 102. Other configurations for the client 110 are possible.

The central-access e-mail server 120, also known as a front-end server, provides an interface for the client devices 110. In example embodiments, the central-access email server 120 is a server configured to handle e-mail sent to and from users. In one embodiment, the email server 120 is a Microsoft Exchange Server provided by Microsoft Corporation of Redmond, Wash. Other configurations are possible.

The information sources 130 provide a back-end interface to the e-mail server 120 and contain one or more databases. One or more of the information sources 130 are contained within the system 100. Examples of such databases include recipient mailbox stores, and address services such as an ACTIVE DIRECTORY® directory service from Microsoft Corporation. Other configurations are possible.

E-mail messages are composed on a client device 110. The client device 110 first establishes a session with the server 120 and communicates with the server. For example, the client may send the server information about its locale or language used. The client also receives information from the server, such as restrictions that may exist for the sender of the message. For example, the client may receive the sender's maximum message size.

During the composition of the e-mail message, recipients are added to the To, CC, and BCC fields of the message. Recipients are added to the message by adding the recipient names individually or by including one or more distribution lists. Text, graphics, attachments, and other content are added to the body of the message.

The adding of recipients, either individually or via a distribution list, is referred to as an e-mail compose event. The e-mail compose event generates communication with the server 120. For example, when an individual recipient or a distribution list is added to the e-mail message, the name of the recipient or the distribution list is communicated to the server. The server 120 is programmed to perform one or more checks based on the recipient or distribution list, as described further below. For example, the server 120 can check to see if the recipient has created an out of office notification, or can check to see how many users are defined for a particular distribution list.

When the central-access e-mail server 120 receives an e-mail compose event, it accesses information sources 130 and validates the message content. Information obtained from information sources 130 regarding each recipient can include one of more of the following: (1) whether the recipient is internal or external to the organization, (2) whether the recipient is in or out of the office (e.g., whether or not the recipient has set an out of office indicator), (3) whether the recipient's mailbox is full, (4) whether the recipient has restricted access (see below), (5) whether the maximum number of recipients is exceeded, and (6) whether there is a custom mail tip for the recipient (i.e., a mail tip containing information specific to the recipient, such as "This mailbox is not monitored." and "Please allow up to 48 hours for a response."

The e-mail address of the recipient is also checked to ensure that it is a valid SMTP address and to determine if it belongs to a recipient inside or outside the sender's organization. Furthermore, the e-mail address can be checked to determine if the address is within the scope of the sender's organization but does not belong to a recipient in the organization's directory. For example, this could occur if the sender misspelled the recipient's address or if the address belonged to a recipient who has departed the organization.

Regarding restricted access, configuration properties of individual mailboxes or of groups such as distribution lists can specify restrictions as to access. For example, one can specify particular people or groups from which e-mail messages can be received. In addition, one can define on server 120 a set of attachment types that may or may not be sent in an e-mail message. For example, the e-mail system can be configured so that executable code (having .exe extensions) or source code files may not be sent in an e-mail message. These properties can be predefined by the administrator of the e-mail system. Having this information available on a server permits it to be efficiently communicated to clients.

Information obtained from information sources 130 regarding a distribution list can include one or more of the following: (1) whether the distribution list is too large, (2) whether the distribution list has restricted access, (3) whether the distribution list is moderated (i.e. whether someone would receive the e-mail message and either approve or reject before forwarding to a larger group), and (4) whether there is a custom mail tip for the distribution list (i.e., a mail tip containing information specific to the distribution list).

Information obtained from information sources 130 regarding the content of the message can include one or more of the following: (1) whether the message size is within administrator-defined parameters, (2) whether there are any attachments included with the message that have restricted access, and (3) whether the message contains a reply-all response from a BCC recipient (i.e., whether a user who received the message as a result of being on the BCC line clicked Reply-All to the message).

The central-access e-mail server 120 evaluates the information obtained from information sources 130 and determines whether there are any attributes of the e-mail message that should trigger a notification to the user. If the server 120 determines that the user should be notified, the server 120 sends a response to a client device 110 to alert the user of the status. The user can then take appropriate action.

For example, if the response indicates that the recipient's mail box is full, the user can delete the recipient's name from the message before sending the e-mail message. It should be noted that certain attribute evaluation tasks, such as whether a recipient's mailbox is full or whether the recipient is out of the office, can typically only be done for recipients that are within the organization.

As another example, when the user adds text to the body of the message, the client is programmed to check the text for compliance with corporate policy. The client retrieves a list of disallowed terms from the server upon session startup. If the client determines that there is a violation of corporate policy in the text, the client sends an e-mail compose event to the server. The e-mail compose event indicates to the server that a content policy violation has occurred in the text. A content policy violation occurs when certain words (keywords) are found in the message or in an attachment to the message that need to be excluded from the message based on administrator-defined policies. The keywords also provide an indication whether or not the exclusion only applies when the keywords are sent externally. Examples of such keywords include expletives, confidential code names for projects (for messages to external recipients) and personally identifiable information such as social security numbers.

There are several types of responses that can be programmed by the client based on status received from the server. In one type of response, referred to as a speed bump, the client displays a dialog box. The dialog box states what the problem is, and requires the user to click OK before proceeding. For example, if the attribute is that the recipient's mail box is full, the e-mail server 120 communicates this to the client device 110. The client device 110, in turn, notifies the user as described above.

In another type of response, known as a roadblock, the client disables sending the e-mail message by disabling (e.g., graying out) the Send button. This response type might be used, for example, if the recipient is not authorized to see the contents of the message.

In a third type of response, the client displays a mail tip. The mail tip alerts the user to the problem with the message but does not require the user to take any action. This response type might be used, for example, if the recipient has set an out of office indicator.

In alternative embodiments, the responses can be conveyed by the client to the user in other manners. For example, in one alternative, the mail tips are displayed in different positions within the user interface. In other alternatives, an audible indication, such as a beep is provided. In yet another embodiment, the response is read aloud using text-to-speech technology. Other configurations are possible.

Figure 2:
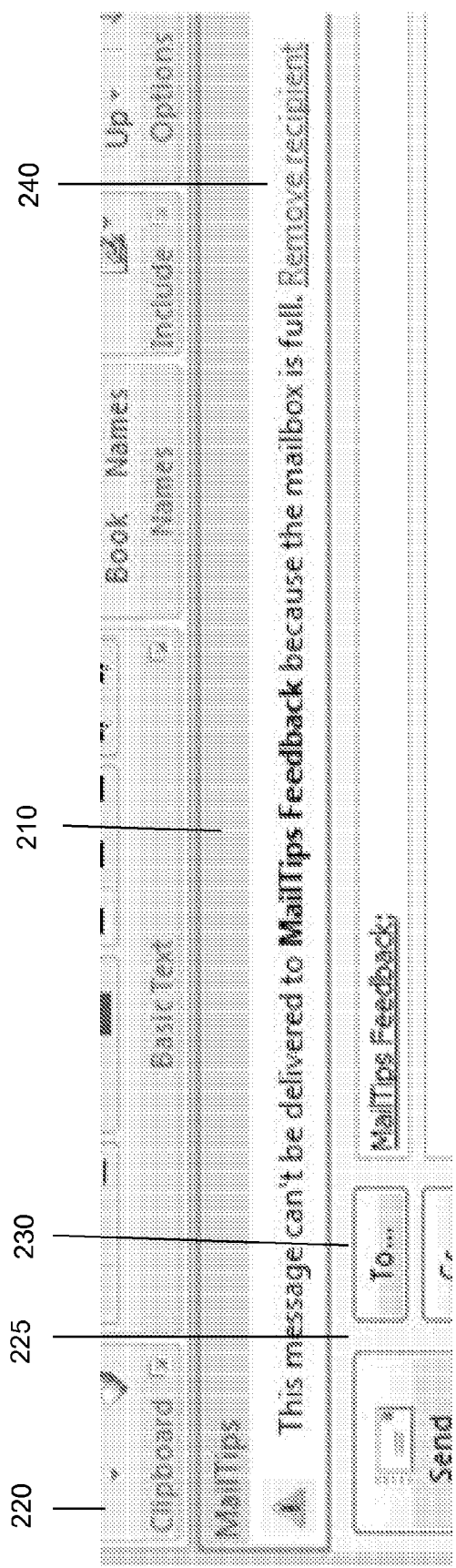
FIG. 2 is an illustration of an example banner for a mailbox full event.

FIG. 2 shows an illustration of an example mail tip 210. The mail tip 210 appears between the Microsoft Office 2007 ribbon 220 and a header 225 including the To line 230 of the message. The ribbon 220 is a panel in Microsoft Office 2007 that contains command buttons and icons. Thus, in the example shown, the mail tip is seamlessly integrated into the message header. The location of the mail tip in the message header can be advantageous because the mail tip is in close proximity to the address field and can be readily noticed by the user. The mail tip 210 can also be displayed in a color, for example yellow, that allows it to stand out in the message header to further draw the user's attention. Audible and other visual alerts can also be used. In this example, the mail tip 210 indicates that the message can't be delivered because the recipient's mailbox is full. This mail tip 210 includes a remove recipient link 240. Clicking on this link 240 deletes the recipient's name from the e-mail message.

Figure 3:
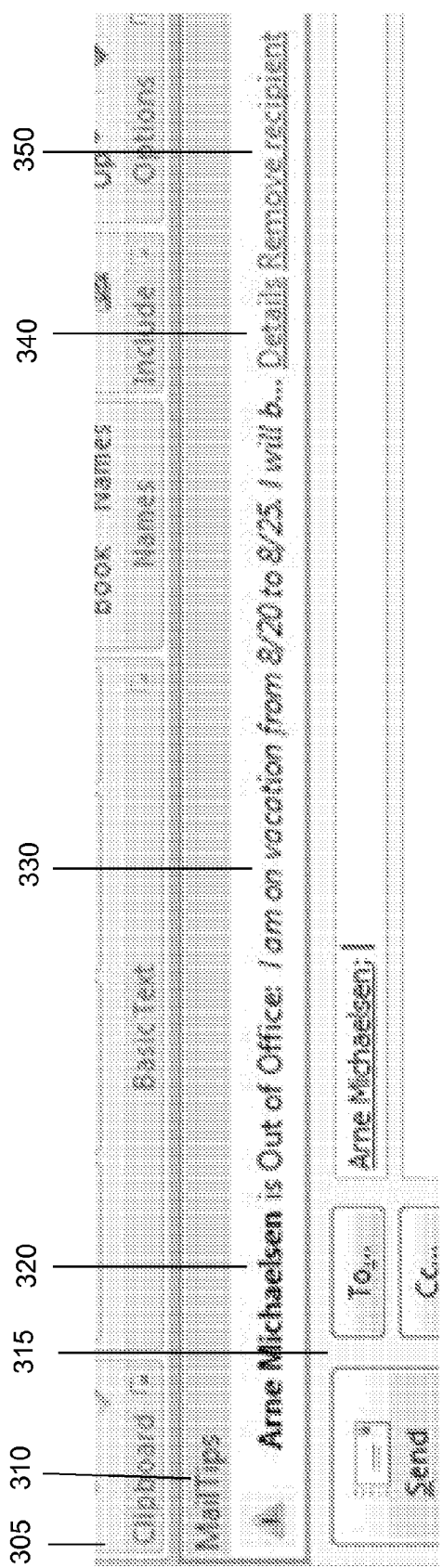
FIG. 3 is an illustration of an example banner for a recipient who is out-of-office.

FIG. 3 shows an illustration of another example mail tip 310. Again, this mail tip 310 is located between a ribbon 305 and a header 315. In this example, the recipient 320 is out of the office. The mail tip 310 also provides details that the recipient 320 included in an out of office message 330. In this example, a details link 340 is provided to display the complete out of office message. A remove recipient link 350 is also provided to permit deletion of the recipient's name 320 from the e-mail message.

In example embodiments, the system 100 is programmed to provide a mail tip banner within a given amount of time so that the user can act accordingly. In one example, 90% of users receive a mail tip banner within 1, 3, 5, 7, or 10 seconds of an e-mail compose event. In another example, 99% of users receive a Mail tip banner within 5, 7, 10, or 15 seconds of an e-mail compose event. Other configurations are possible. For example, in other embodiments, network or other configurations may not allow the system to perform to these standards. In yet other embodiments, the system may perform more quickly.

Figure 4:
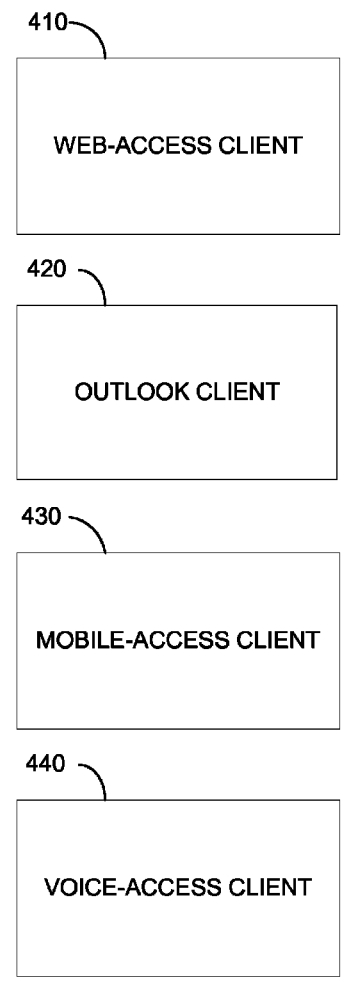
FIG. 4 is an illustration of example client interfaces.

FIG. 4 shows four example types of client interfaces to an e-mail server, such as e-mail server 120 described above. A web-access client, shown in block 410, accesses an e-mail server remotely using an Internet connection. For example, Outlook Web Access is a webmail service of Microsoft Exchange Server 2007. A client device, such as a personal computer or a personal digital assistant can use a web browser to connect to Microsoft Exchange Server 2007 via Outlook Web Access. This brings up a user interface similar to the interface in Microsoft OUTLOOK® messaging and collaboration client. A user can compose an e-mail message using this interface.

A second client shown in block 420 is Microsoft OUTLOOK® messaging and collaboration client. Microsoft OUTLOOK® messaging and collaboration client is an e-mail application that is part of the Microsoft Office suite. Microsoft OUTLOOK® messaging and collaboration client operates in conjunction with a Microsoft Exchange e-mail server such as Microsoft Exchange Server 2007. A user can compose, send and receive e-mails with Microsoft OUTLOOK® messaging and collaboration client.

A third client shown in block 430 of FIG. 4 is a mobile access client such as Microsoft Mobile Access with ACTIVE-SYNC® technology or the Microsoft Windows Mobile Device Center for Microsoft Vista. Using a mobile access client like Microsoft Mobile Access with ACTIVESYNC® technology, a user can synchronize messages between a mobile device and the Microsoft Exchange Server 2007. The mobile device can be a cellular telephone or a personal digital assistant.

A fourth client shown in block 440 of FIG. 4 is a voice-access client such as Microsoft Exchange Unified Messaging that is supported in Microsoft Exchange Server 2007. With Microsoft Exchange Unified Messaging, users have one inbox for e-mail and voicemail. Voicemails are delivered directly into the Microsoft OUTLOOK® messaging and collaboration client inbox. In addition, Microsoft Exchange Unified Messaging delivers access from Microsoft OUTLOOK® messaging and collaboration client, Outlook Web Access, a variety of mobile devices and ordinary telephones.

The clients shown in FIG. 4 can generate e-mail compose events and the corresponding mail tips either directly or indirectly. For example, e-mails can be composed using Microsoft OUTLOOK® and Microsoft Web Access and mail tips can be sent to these clients during the composition of the e-mail message as described above. In addition, the voice mails deposited in a user's mail box using a voice-access client such as Microsoft Exchange Unified Messaging can be replied to and forwarded to generate an e-mail compose event.

Figure 5:
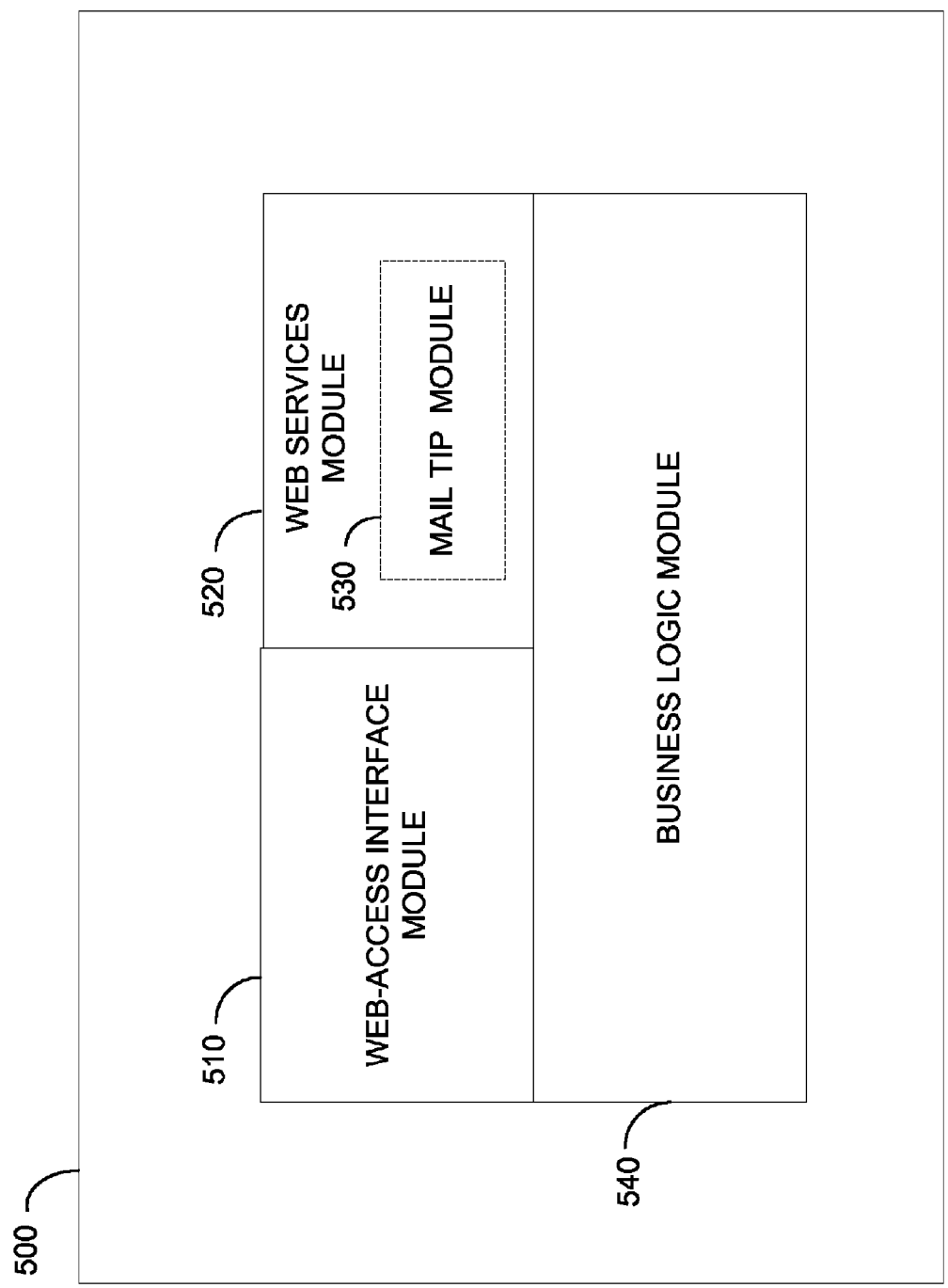
FIG. 5 is an illustration of example modules of an e-mail server.

Referring now to FIG. 5, an example illustration of the modules in a central-access e-mail server 500 are shown. A web access module 510 provides an interface between a web-mail client and the e-mail server 500. For example, the web access module 510 provides an interface between Outlook Web Access and Microsoft Exchange Server 2007.

Also shown in FIG. 5 is the web services module 520. Web services support machine to machine communication over a network, such as the Internet. One example of the web services module 520 is Exchange Web Services, part of Microsoft Exchange Server 2007. Also shown in FIG. 5 is the mail tip module 530 which is an extension of the web services module. The mail tip module 530 contains mail tips appropriate for various e-mail compose events. Including the mail tips module 530 on the e-mail server provides for efficient management of mail tip messages.

In one embodiment, the mail tip module 530 is an extension to Exchange Web Services. Applications that use Exchange Web Services, such as mail tip module 530, can access data store items. The data store items can be accessed locally on Microsoft Exchange Server 2007 or remotely via the Simple Access Object Protocol (SOAP). The mail tip module 530 provides an engine for generating a variety of mail tips based on the validation of the e-mail message by the e-mail server.

A third module shown in FIG. 5 is business logic module 540. This module is part of the Microsoft Exchange Server 2007 core and provides an interface between front-end e-mail server modules, such as mail tip module 530 and back-end information sources. The business logic module 540 also contains drivers for the ACTIVE DIRECTORY® directory service database.

Figure 6:
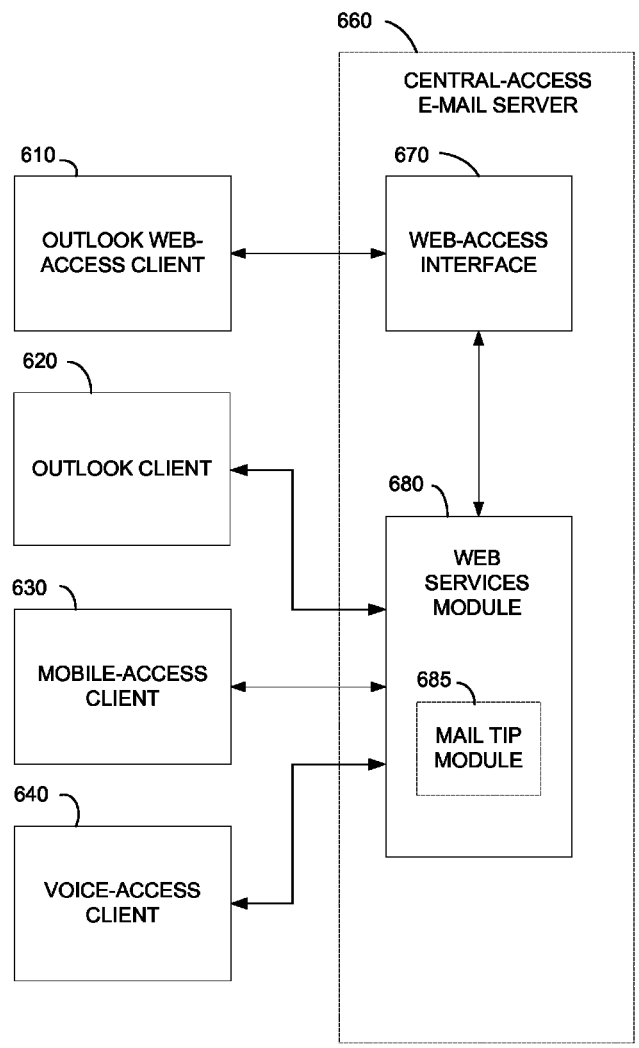
FIG. 6 is an illustration of example communication between example client interfaces and example modules of an e-mail server.

FIG. 6 shows the interface between the e-mail clients and the central-access e-mail server. As shown in FIG. 6, outlook web Access client 610 communicates with the web access interface 670 of the central access e-mail server 660. The outlook client 620, mobile access client 630 and voice access client 640 communicate with a mail tip module 685. The web access interface 670 and mail tip module 685 receive e-mail compose events from the clients and in-turn send the clients responses containing a well-defined status. The client action is based on this status. For example, the client may respond with a speed bump (a dialog box) or by displaying a mail tip banner.

Figure 7:
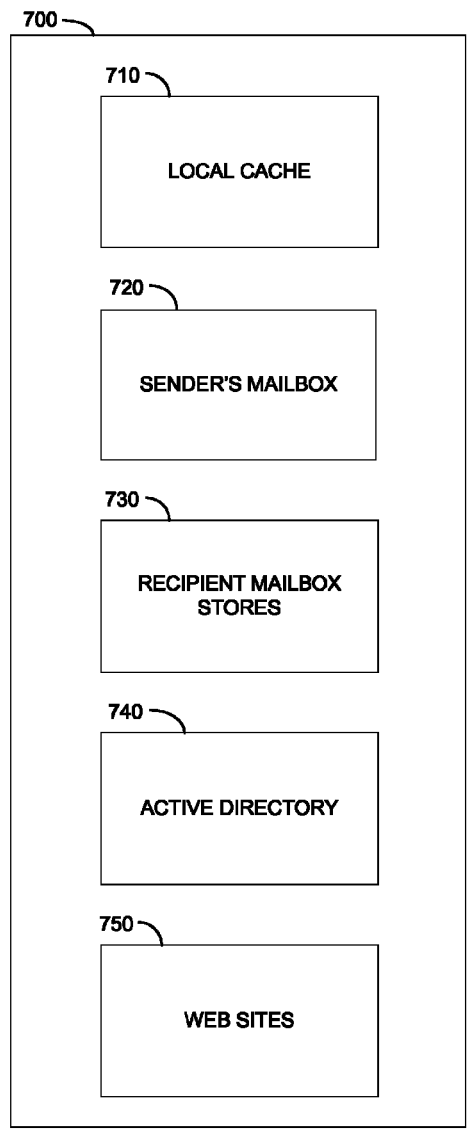
FIG. 7 is an illustration of example information sources in an e-mail system.

FIG. 7 illustrates the information sources 700 that constitute the back-end databases of the e-mail server. The local cache 700 is contained within the e-mail server front end. It stores key items of recent server transactions, including recipients, distribution lists and key words. The local cache 700 also stores invalid SMTP addresses that were contained in the e-mail messages. For example, the local cache 700 can include a list of domains (e.g., "company.com") that do not accept e-mail. This information can be used to quickly inform someone addressing an e-mail to a recipient having an email address with a domain found in the local cache 700 that the address may be invalid. In an alternative example, the local cache can include a list of distribution groups, their sizes and whether or not they include external recipients. This allows the server to advise the client how large their audience is and whether there are external people on the message.

Other information sources 700 include the sender's mailbox 720, recipient mailbox stores 730 (i.e. mailboxes of recipients), ACTIVE DIRECTORY® directory service 740 and one or more websites 750. These information sources can be located on other machines. Information is typically obtained from these sources via Remote Procedure Calls (RPCs), via web services using the Simple Access Object Protocol (SOAP) or via http when information gathering is proxied (forwarded) to remote servers. Active Directory 740 is a database that provides central authentication and authorization services for Windows based computers. It provides information about recipients of the e-mail message.

Figure 8:
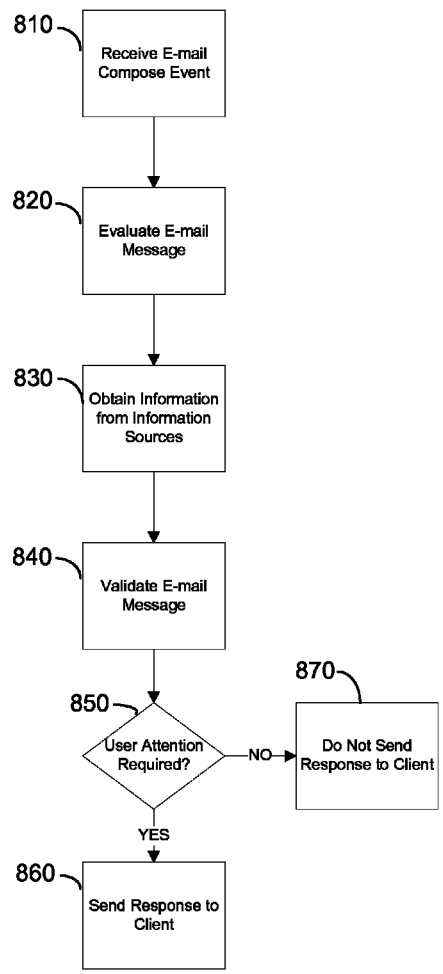
FIG. 8 is an illustration of an example flowchart for a server to validate the content of an e-mail message during the composition of the message.

FIG. 8 illustrates an example method of an email server to check the content of an e-mail message. At operation 810, an e-mail compose event is received at the e-mail server. The e-mail compose event occurs when a user adds a recipient or a distribution list to the e-mail message. At operation 820, the server evaluates the message. For example, the server determines whether the recipient's mailbox is full, whether the recipient or a distribution list has restricted access and whether the recipient is out of the office. In addition, the server checks the e-mail message against configured attributes of the e-mail system, such as whether the size of the message and the number of recipients listed on the message are within configured limits.

In order to evaluate the above items at operation 820, the server obtains information about these items from a variety of information sources at operation 830. Some examples of information sources are the recipient's mailboxes, configuration parameters of the e-mail server and local cache of the e-mail server. Based on the information obtained and content of the e-mail message, the server at operation 840 validates the e-mail message and determines whether the user needs to be alerted to any changes that should be made to the message or to conditions where the message should not be delivered.

At operation 850, if there are any aspects of the e-mail message that require user attention, a response is sent to the client device at operation 860 to provide status to the user. The response may include a mail tip or a dialog box. In addition, if the server determines that the e-mail message should not be sent, the response may include a disabling mechanism, such as graying out and disabling the e-mail send button. If user attention is not required, the server does not send a status response to the client.

Regarding the recipient's SMTP address, a determination can be made on validity by examining the domain of the address (i.e., everything to the right of the "@" sign). For example, it can be determined if the domain is invalid, if it contains a common misspelling or the domain does not accept e-mail messages. Such checks can require querying of databases external to system 100, such as a Domain Name System (DNS) system. It should be noted that these checks are "best effort" determinations and can never be 100% accurate.

In addition, in one embodiment a cache is kept of SMTP addresses for which communication has not been successful. This cache of SMTP addresses can be kept outside of the e-mail server, making use of other information sources within the organization. For example, an organization may communicate with Microsoft HOTMAIL® web-based e-mail service. This external e-mail system may also keep track of SMTP addresses for which communication has been successful and for which communication has not been successful. For efficiency purposes, the organization may combine caches. When evaluating the validity of an SMTP address, instead of accessing an information source associated with the e-mail server, this external cache may be checked first as a way to speed up the response to the user. If the recipient's SMTP message is on the combined cache, the e-mail server can provide a faster response to the user.

Figure 9:
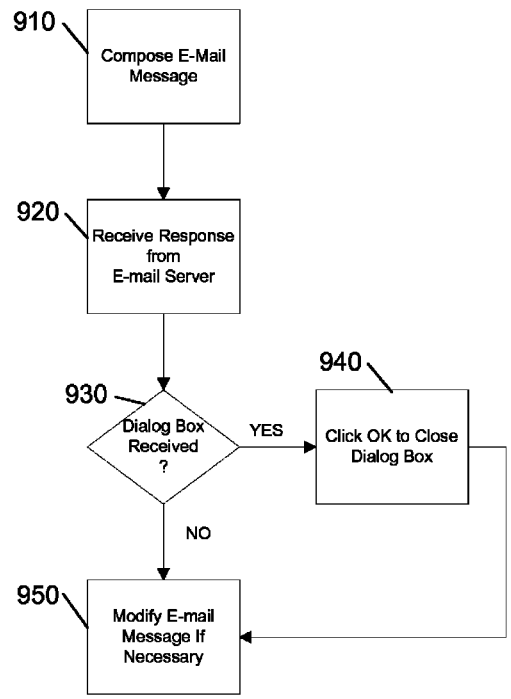
FIG. 9 is an illustration of an example flowchart for a client receiving validation of the content of an e-mail message during the composition of the message.

FIG. 9 illustrates a method of creating an e-mail using a client device. At operation 910, a user composes an e-mail message at a client device. As the message is composed, at operation 920, the client device may receive a mail tip or receive a communication to invoke a dialog box which is displayed on the client device. The mail tip can contain information or a message alerting the user of an attribute of the e-mail message that the user may want to modify. If a dialog box was received at operation 930, the user needs to click OK at operation 940 to acknowledge the information and to close the dialog box. The user may use the information in the mail tip or dialog box at operation 950 to modify the e-mail message before it is sent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system for identifying attributes associated with content of an e-mail message and alerting a user regarding the attributes, the system comprising:
    a client device programmed to allow a user to create an e-mail message including at least one recipient and a message content;
    a server programmed to check an attribute of the e-mail message, and to send the e-mail message; and
    one or more information stores in communication with the server, the information stores including information about the e-mail message;
    wherein the server is programmed to query the information stores to obtain information about the e-mail message as the e-mail message is being composed by the user, and the server sends a response to the client regarding the e-mail message;
    when the response includes a mail tip, the client is programmed to provide the mail tip to the user based on the response, the mail tip being formatted and positioned by the client so that it is integrated within the e-mail message; and
    when the response includes a roadblock, the client is programmed to disable a send button of the e-mail message based on the response to prevent the e-mail message from being sent, the roadblock comprising the at least one recipient not being authorized to see the contents of the e-mail message, the send button being grayed out to indicate that the send button is disabled.

2. The system of claim 1, wherein the client is further programmed to display a dialog box, the dialog box being programmed to require the user to acknowledge the dialog box before sending the e-mail message.

3. The system of claim 1, wherein the client is further programmed to position the mail tip between a ribbon and an address field in a header section of the e-mail message.

4. The system of claim 1, wherein the attributes of the e-mail message checked by the server are selected from the group consisting of: (1) a size of the e-mail message exceeds a threshold, (2) a number of recipients contained in the e-mail message exceeds a threshold, (3) the e-mail message contains a restricted attachment, (4) the e-mail message contains an improperly formed Simple Mail Transport Protocol address, and (5) the e-mail message contains a reply-all response from a Blind Carbon Copy recipient.

5. The system of claim 1, wherein the attributes of the email message checked by the server are selected from the group consisting of: (1) the recipient is out of office, (2) the recipient is external to an organization, (3) the recipient's mailbox is full, (4) the recipient has restricted access, (5) the recipient's e-mail address is misspelled, and (6) the recipient is no longer employed in the organization.

6. The system of claim 1, wherein the attributes of the email message checked by the server are selected from the group consisting of: (1) a size of a distribution list exceeds a threshold, (2) the distribution list is a moderated distribution list, (3) the distribution list has restrictions regarding access, and (4) the distribution list includes members external to the organization.

7. The system of claim 1, wherein the client is selected from the group consisting of: (1) a desktop e-mail client, and (2) a mobile device client.

8. The system of claim 1, wherein the information stores are selected from the group consisting of: (1) the sender's mailbox, (2) the recipient's mailbox database stores, (3) a local cache, 4) a directory service, and (5) a remote server.

9. The system of claim 1, wherein the server includes a web services module, the web services module containing a mail tip module.

10. The system of claim 9, wherein the mail tip is displayed by the client within a given period of time of an e-mail compose event.

11. The system of claim 1, wherein the mail tip is displayed by the client within a given period of time of an e-mail compose event.

12. A method for alerting a user to information associated with sending of an e-mail message, the method comprising:
receiving from a client an e-mail compose event, the e-mail compose event occurring during composition of an e-mail message;
accessing one or more information stores to obtain information about the e-mail message;
checking an attribute associated with the e-mail message selected from the group consisting of: (1) a size of the e-mail message exceeds a threshold, (2) a number of recipients contained in the e-mail message exceeds a threshold, (3) the e-mail message contains a restricted attachment, (4) the e-mail message contains a reply-all response from a Blind Carbon Copy recipient, (5) the recipient's mailbox is full, (6) a size of the distribution list exceeds a threshold, (7) the distribution list is a moderated distribution list, and (8) the distribution list has restrictions regarding access;
selecting a mail tip from a plurality of mail tips, the mail tip corresponding to the information about the e-mail message obtained from the one or more information stores;
sending a response to the client during the composition of the e-mail message, the mail tip being configured such that the client can integrate the mail tip within a header section of the e-mail message; and
disabling a send button of the e-mail message when the response includes a roadblock to prevent the e-mail message from being sent, the roadblock comprising the recipient not being authorized to see the contents of the e-mail message, the send button being grayed out to indicate that the send button is disabled.

13. The method of claim 12, further comprising accessing the information stores selected from the group consisting of: (1) the sender's mailbox, (2) the recipient's mailbox database stores, (3) a local cache, (4) a directory service, and (5) a web site.

14. A method for validating a Simple Mail Transport Protocol (SMTP) address of an e-mail message, the method comprising:
receiving from a client an e-mail compose event, the e-mail compose event occurring during composition of an e-mail message, the e-mail compose event including an addition of one or more recipients having SMTP addresses;
accessing at a server a cache of SMTP addresses;
checking one of the SMTP addresses of one of the recipients by checking that a domain associated with the SMTP address matches one listed in the server cache of SMTP addresses;
performing a Domain Name Service lookup for the domain;
sending a response to the client during the composition of the e-mail message before the e-mail message is sent if the domain is matched; and
disabling a send button of the e-mail message when the response includes a roadblock to prevent the e-mail message from being sent, the roadblock comprising the one of the recipients not being authorized to see the contents of the e-mail message, the send button being grayed out to indicate that the send button is disabled.

* * * * *